L. VANDERMARK.
CROSS HEAD CONNECTION FOR PISTON RODS.
APPLICATION FILED AUG. 24, 1915.
1,206,622.
Patented Nov. 28, 1916.
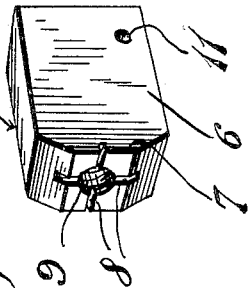
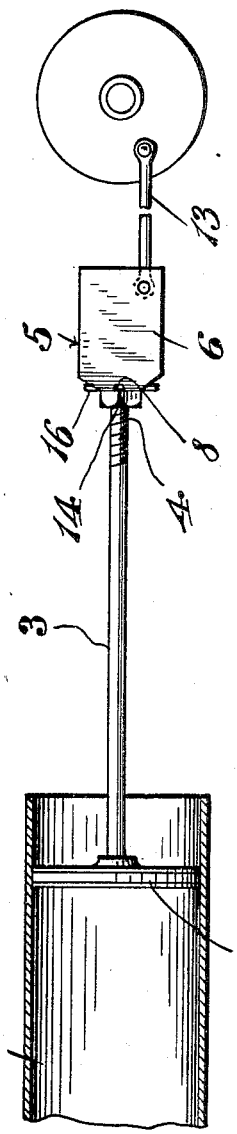
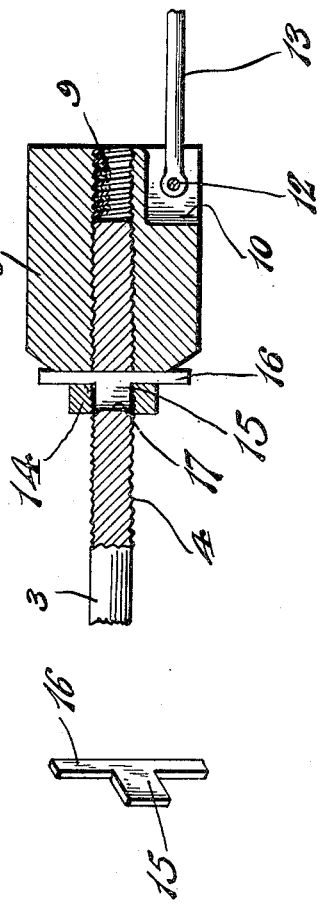
Inventor
Lee Vandermark

UNITED STATES PATENT OFFICE.

LEE VANDERMARK, OF STEVENSON, WASHINGTON.

CROSS-HEAD CONNECTION FOR PISTON-RODS.

1,206,622.

Specification of Letters Patent.

Patented Nov. 28, 1916.

Application filed August 24, 1915. Serial No. 47,091.

*To all whom it may concern:*

Be it known that I, LEE VANDERMARK, a citizen of the United States, residing at Stevenson, in the county of Skamania and State of Washington, have invented certain new and useful Improvements in Cross-Head Connections for Piston-Rods; and I do hereby declare the following to be a full, clear, and exact description of the invention, such as will enable others skilled in the art to which it appertains to make and use the same.

This invention relates to new and useful improvements in cross head connectors for piston rods and the principal object of the invention is to provide a device which will prevent the piston rod from becoming loose in the cross head and turning over so that the distance between the cross head and piston will remain at all times the same.

Another object of the invention is to provide a device which may be readily used in connection with the ordinary type of engine without necessitating the modification of the structure thereof.

Heretofore it has been the practice in operating steam or oil engines using a piston rod and cross head connection to adjust the piston with relation to the cross head and hold it in the adjusted position by means of a lock nut. By this method the continual movement of the piston rod has caused the lock nut to become loosened so that the piston rod becomes loosened in the cross head and allows the distance between the piston and cross head to vary so that the cylinder in which the piston operates since it is not long enough to accommodate the varying stroke of the piston is apt to burst or have one of the cylinder heads blown out.

A further object of this invention is to avoid such accidents and thereby remove much of the danger accompanying the use of steam and oil engines of the above type.

With these and other objects in view, the invention consists in the novel combination and arrangement of parts which will be fully set forth in the following specification and accompanying drawings, in which:—

Figure 1 is a side view showing this improved piston rod and cross head connector. Fig. 2 is an enlarged detail sectional view of Fig. 1. Fig. 3 is a view illustrating the key used in connection with the device, and Fig. 4 is a detail perspective view of the cross head.

Referring to the drawings by characters of reference the numeral 1 designates a cylinder of the ordinary construction in which the piston 2 is slidable. The usual piston rod 3 is connected to the piston and provided at its oppoiste end with suitable external screw threads 4, which engage the threads of the cross head as shown in Fig. 2, so that the distance between the cross head and piston may be varied.

The cross head is designated generally by the numeral 5 and comprises a rectangular body 6 having formed at its forward end the extension 7, provided with transverse grooves 8 arranged at right angles as illustrated in Fig. 4. These grooves are arranged so as to cross centrally of the internal screw threaded bore 9 of the body 6 as clearly shown in the drawings. Formed at one corner of the body 6 is a recess 10, the opposite walls of which are provided with the openings 11 for the reception of the pin 12 by means of which the connecting rod 13 is pivotally mounted with relation to the cross head.

The threads in the opening 9 of the cross head coincide with the threads 4 on the piston rod 3 and threaded on said piston rod in advance of the cross head is a suitable nut 14 which usually serves the purpose of a lock nut to prevent the piston rod and piston from turning with relation to the cross head.

A suitable key designated by the numeral 15 is provided and comprises an enlarged central body having the longitudinally extending arms 16 formed thereon, these extensions being adapted to lie in the groove 8 when the device is in its assembled position.

In the operation of the device, the piston is placed in the cylinder in the usual manner so that the piston rod projects in the direction of the cross head and upon entering the end of the piston rod into the cross head opening 9, it will be seen that the same may be threaded into place so that the distance between the cross head and piston may be adjusted. After the cross head has been adjusted to the proper space with relation to the piston, a suitable slot 17 is cut in the piston rod and the key 15 is then inserted in the slot whereupon the nut 14 is threaded up against the key so as to force the same into one of the grooves 8 in the cross head. In this way it will be seen that the cross head and piston rod will be held against relative rotation and therefore danger of the adjustment varying is eliminated.

While in the foregoing there has been shown and described the preferred embodiment of this invention, it is to be understood that such changes may be made in the combination and arrangement of parts as will fall within the spirit and scope of the appended claim.

What is claimed is:—

The combination with a piston rod having one of its ends threaded and being provided with a longitudinally extending slot, of a block provided with a longitudinally extending axially threaded bore adapted to be threaded on to the piston rod, said block being provided with a plurality of transversely extending grooves in one end, a key adapted to project through the slot in the piston rod and to lie within a pair of the grooves in the block, said key having a tongue adapted to fill the slot in the piston rod, the tongue being of slightly less width than the diameter of the piston rod so that the same lies wholly within the slot and a nut threaded on the piston rod and adapted to bear against the key to hold the same within the grooves and surround the tongue thereof to prevent said key from moving longitudinally.

In testimony whereof I affix my signature in presence of two witnesses.

LEE VANDERMARK.

Witnesses:
  G. E. LINN,
  C. ALEXANDER.

Copies of this patent may be obtained for five cents each, by addressing the "Commissioner of Patents, Washington, D. C."